Jan. 21, 1958    H. DAVIES    2,820,938

MULTI-SPEED ALTERNATING CURRENT MOTOR

Filed March 11, 1955    5 Sheets-Sheet 1

INVENTOR:
HOWARD DAVIES
BY Howson & Howson
ATTYS.

Jan. 21, 1958 H. DAVIES 2,820,938
MULTI-SPEED ALTERNATING CURRENT MOTOR
Filed March 11, 1955 5 Sheets-Sheet 3

STAR CONNECTION

INVENTOR
HOWARD DAVIES
BY Howson & Howson
ATTYS.

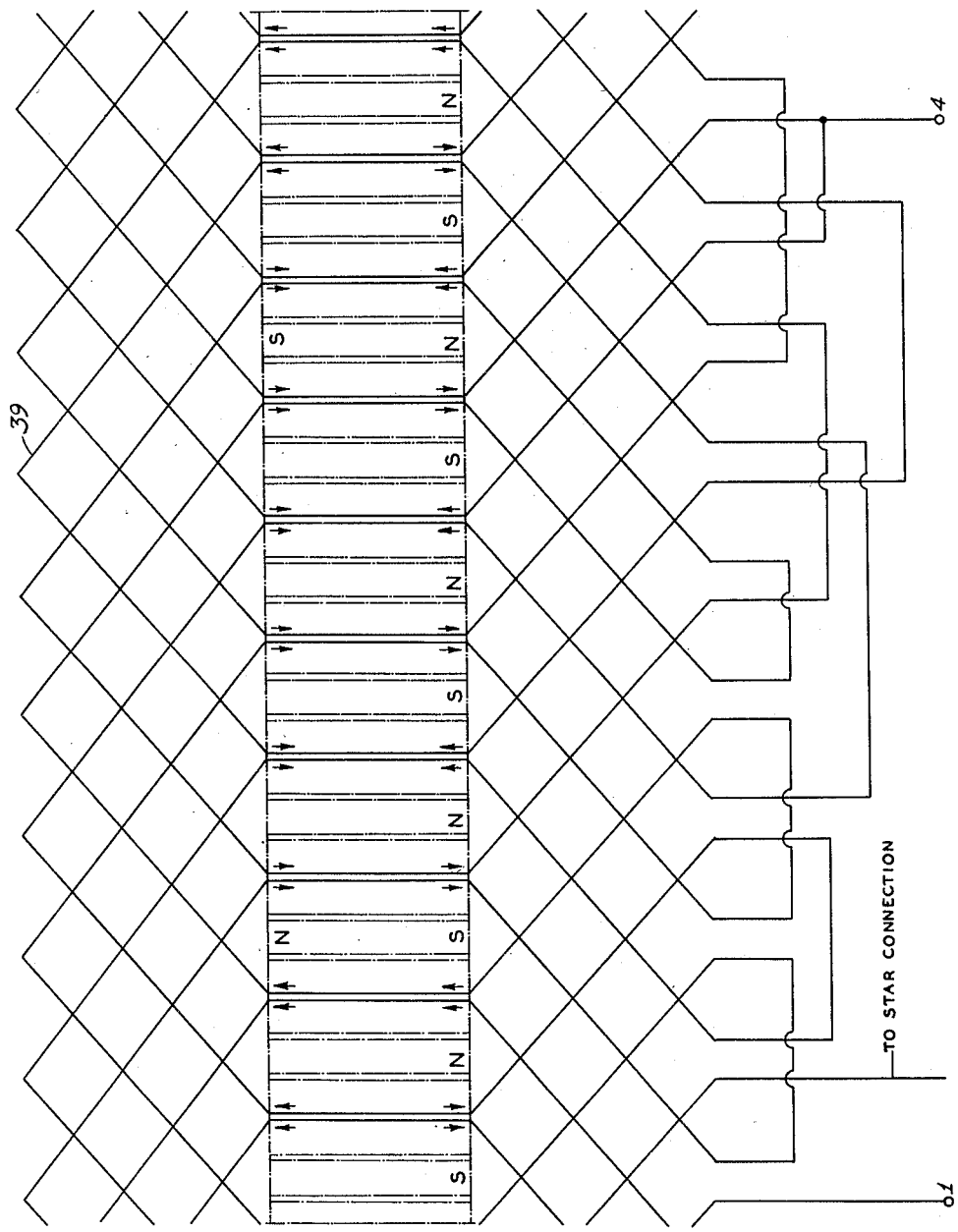

United States Patent Office 2,820,938
Patented Jan. 21, 1958

2,820,938

MULTI-SPEED ALTERNATING CURRENT MOTOR

Howard Davies, Yeadon, Pa., assignor, by mesne assignments, to John F. McCarthy, Inc., Philadelphia, Pa., a corporation of Pennsylvania Application March 11, 1955, Serial No. 493,645

18 Claims. (Cl. 318—224)

This invention relates to multi-speed alternating current motors, and more particularly to motors of the type in which speed change is effected by changing the number of magnetic poles produced by current flow in the same winding or windings.

Heretofore motors of this type, in practice, have generally been limited to a two-to-one ratio of the different numbers of poles produced, and thus have been limited to this ratio of two speeds. While proposals have been made for obtaining other ratios of pole numbers and speeds by means of pole changing windings, they have not been entirely satisfactory and have not been widely used.

Therefore, when an A. C. induction motor having different speeds in a ratio other than two-to-one has been required, it has been customary to provide a motor having two separate stator windings and a common squirrel cage rotor. In such a motor, approximately one-half of the stator copper is inactive on each speed, and, as a consequence, the motor requires a rather large frame for a given horsepower output.

The principal object of the present invention is to provide a practical and highly satisfactory winding arrangement by which speed ratios other than two-to-one can be obtained with one winding or, in the case of a polyphase motor, one winding per phase.

Another object of the invention is to provide such a winding arrangement which is simple, economical and efficient.

Still another object of the invention is to provide a winding arrangement wherein the whole winding is active all of the time, i. e. on both speeds of the motor, by reason of which the motor frame for a given horsepower output is small in comparison to an equivalent double wound motor and is therefore less costly.

Other objects and features of the invention will be apparent from the following detailed description with reference to the accompanying drawings, wherein:

Figs. 4 to 7 illustrate other applications of the winding arrangement.

Figure 1:
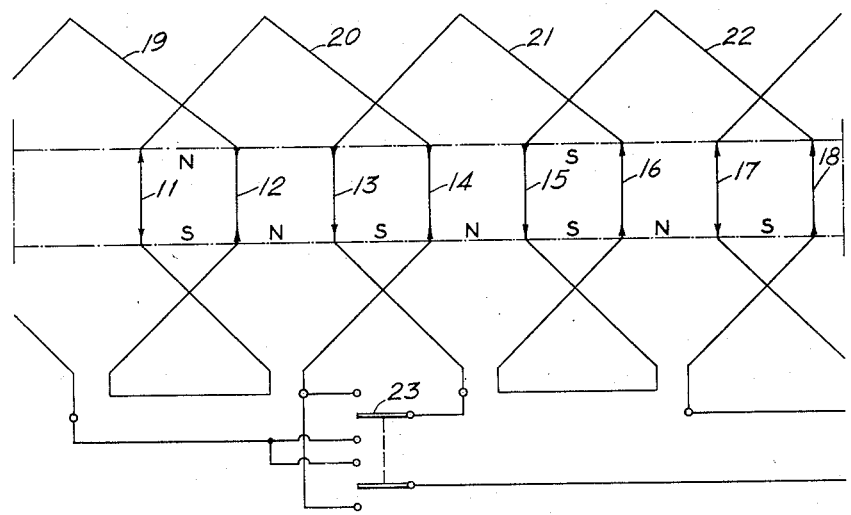
Fig. 1 is a simple diagrammatic illustration of a single phase winding arrangement according to this invention.

To understand the basic principle of this invention, consider a slotted stator such as is found on an A. C. motor having eight equally spaced slots and conductors 11 to 18 laid in the slots, as illustrated in Fig. 1. If the conductors in four successively adjacent slots are caused to carry current in the downward direction, and the conductors in the remaining four successively adjacent slots are caused to carry current in the upward direction, two magnetic poles are produced and the motor operates at high speed. If, instead, the conductors are caused to carry current alternately up and down, eight magnetic poles are produced and the motor operates at low speed. These two current patterns are illustrated in Fig. 1 by the upper and lower arrowheads. Also illustrated in Fig. 1 is a winding arrangement for producing these current patterns. In this instance, a single winding is shown comprised of four coils 19 to 22, each coil having a pitch or span of three slots. The winding is divided into two sections each having two coils. One section, comprising coils 21 and 22, carries current in the same direction during both the two and the eight pole operation. The direction of current flow in the other section, comprising coils 19 and 20, is reversed to change from two to eight poles and vice versa.

Thus Fig. 1 illustrates a winding consisting of four similar coils laid in eight slots, each coil having a span of three slots. Reversal of current in one half of the winding, that is in two coils, by actuation of switch 23, changes the arrangement from two to eight poles. This winding, then, has a pole number ratio or speed ratio of four-to-one.

Figure 2:
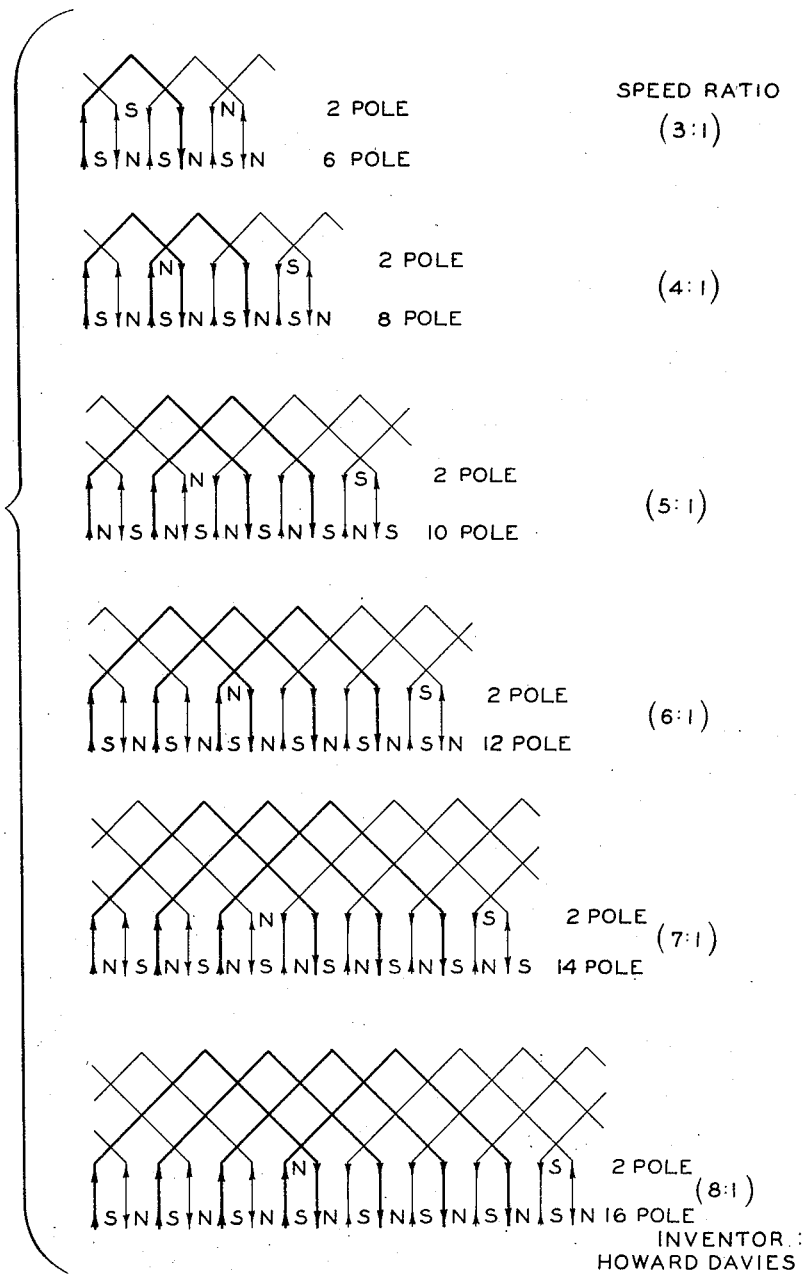
Fig. 2 shows how various speed ratios may be obtained with this winding arrangement.

Fig. 2 shows how the same arrangement can be used to obtain any desired ratio of two speeds, simply by using the appropriate number of coils in each section of the winding. In each instance the two sections of the winding are shown by heavy and light lines to distinguish them.

The windings illustrated in Figs. 1 and 2 all have two poles for the small number of poles. However, any of these windings can be duplicated, triplicated, or repeated any number of times around the periphery of an A. C. motor having a suitable number of slots, so that the smaller number of poles of such a winding can be any even number, and the larger number of poles will be this same even number multiplied by the speed ratio of the winding. For example, the four-to-one speed ratio winding illustrated in Fig. 1 has two and eight poles. Repeating this winding on the same machine will produce windings having four and sixteen poles, or six and twenty-four poles, or eight and thirty-two poles, and so on indefinitely.

Figs. 1 and 2, and the description thus far, show how to provide a single phase winding in an A. C. motor having any even number of poles for the smaller number of poles, and any integral multiple of that number for the larger number of poles. A polyphase A. C. motor requires two or more phase windings displaced from one another. When these windings are of the type provided by this invention, there is a restriction which may be stated as follows: No winding is possible when the speed ratio is divisible by the number of phases. For example, three phase windings are not possible with speed ratios of three-to-one, six-to-one, nine-to-one, etc. Apart from this restriction, it is possible to produce pole changing windings of the type described above for motors having any number of phases.

The single phase A. C. motor occupies a special position with respect to this restriction. Ordinarily a single phase induction motor has on the stator a main winding and an auxiliary starting winding displaced from the main winding by 90 electrical degrees. If both of these windings are to be of the pole changing type above described, then the restrictions of a two phase motor apply and only odd numbered speed ratios are possible. If, however, only the main winding is to be pole changing, or if both windings are to be pole changing but the displacement is other than 90 electrical degrees, then any integral speed ratio is possible.

Figure 3:
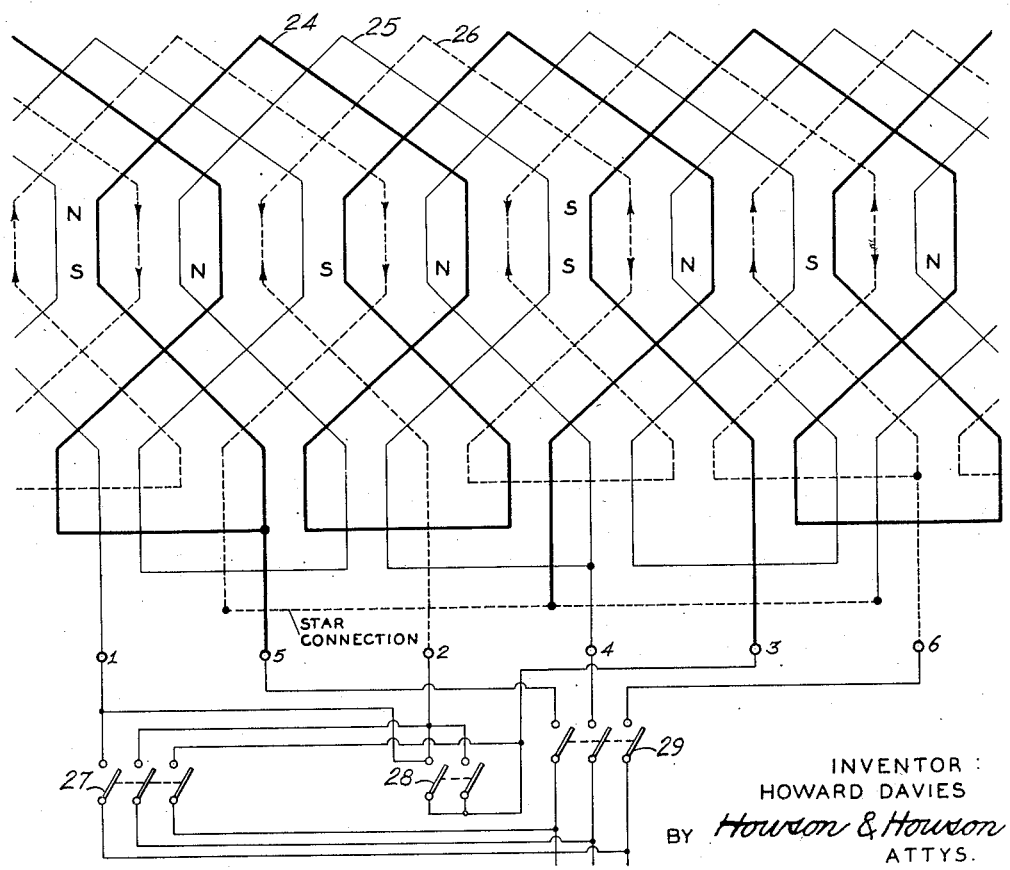
Fig. 3 shows an application of the winding arrangement to a three-phase motor.

Fig. 3 illustrates a three-phase, two and eight pole, stator winding for an induction motor having twenty-four slots. This winding has one slot per low speed pole-phase belt, and is the simplest possible three-phase winding according to this invention. The winding is arrived at by taking the single winding illustrated in Fig. 1 and adding two similar windings displaced from the first by 120 and 240 electrical degrees respectively. The three windings are designated 24, 25 and 26 and are shown by heavy, light and dotted lines. The arrowheads on winding 26 show how each winding forms two or eight poles by change of current direction in one section of the winding.

The windings illustrated in Fig. 3 are complete in showing connections between the coils and the six leads that are brought out of the motor. The switching arrangement shown may be employed. Thus for low speed operation switch 27 is closed and switches 28 and 29 are opened, and for high speed operation switches 28 and 29 are closed and switch 27 is opened. The windings are shown with a single series circuit for each phase winding on the low speed and two parallel circuits per phase on the high speed, and the three-phase windings are shown connected Y on both speeds. These connections are not a necessary part of the invention. Any connection, whether it employs six leads or not, which reverses the current flow in one section of each phase winding in changing from one speed to the other can be used. The numbering of the terminals employed in Fig. 3 is that recommended in American Standard C6.1 Terminal Markings for Electrical Apparatus.

Considering the winding arrangement of Fig. 3 in greater detail, each winding is a single layer basket winding, there being twelve basket type coils in all each with a span of nine slots. The arrangement of the conductors in the slots for the low-speed eight-pole connection is exactly what would be expected for a normal three-phase eight-pole winding in twenty-four slots, but the span of the coils is about three times what would be expected. For the high-speed two-pole connection, the span of the coils is about what would be expected but the arrangement of the conductors in the slots is unusual. There are four slots per phase per pole, and normally the slots belonging to one phase would be four adjacent slots, but in the winding arrangement of Fig. 3 the slots belonging to one phase are spread uniformly over the full 180° of the pole, with the slots belonging to the other phases interleaved between them.

Having the slots of one phase spread over the whole pole width affects the winding distribution factor on the high speed. In the usual single-speed three-phase motor, the winding of one phase is spread over 60 electrical degrees or ⅓ of the pole width, and the winding distribution factor approaches $$\frac{\sin 30°}{\pi/6} = \frac{3}{\pi} = .955$$

when the number of slots in the phase belt is large. In windings according to this invention, on the high speed connection the winding of one phase is spread over 180 electrical degrees and the winding distribution factor approaches $$\frac{\sin 90°}{\pi/2} = \frac{2}{\pi} = .636$$

when the number of slots in the phase belt is large. Thus for a three-phase winding according to this invention, the conductors on the high-speed connection are about ⅔ as effective as those of a normal three-phase winding in the same slots would be.

The above description of the essence of the invention provides the clue to its advantages over the double wound stator that it is intended to replace. On the low speed connection, the conductor arrangement is that of a normal single speed single winding motor having this number of poles and phases. So the frame size required will be the same as that required for a single speed motor of the same rating. As is well known, this frame size is considerably smaller than that required for a double wound motor.

On the high speed connection, the situation is not quite so favorable because as was shown above the conductors are only about ⅔ as effective as those of a normal single wound motor. This, however, is still a considerable improvement over the double wound motor where only about ½ the conductors are active. Furthermore, in many applications of two speed A. C. motors it is the low speed rating which determines the frame size and this is oversize for the high-speed rating. In this case the ⅔ effectiveness of the conductors on high speed is even less significant.

In order to define the basis of this invention more precisely let:

The subscript L refer to the low speed.
The subscript H refer to the high speed.
2P be the number of poles.
Y be the pole pitch expressed as a number of slots.
q be the number of phases.
M be the pole number ratio or speed ratio.
C be the number of slots per pole per phase.
Then M is defined by the equation:

$$M = \frac{2P_L}{2P_H} = \frac{\text{High speed synchronous speed}}{\text{Low speed synchronous speed}}$$

Certain fundamental relations exist between the above quantities. These relations arise directly from the definitions. The relations are:

$$Y_L = q \times C_L \text{ and } Y_H = q \times C_H$$

$$2P_L \times Y_L = 2P_H \times Y_H = 2P_L \times qC_L = 2P_H \times q \times C_H$$

$$M = \frac{2P_L}{2P_H} = \frac{Y_H}{Y_L} = \frac{C_H}{C_L}$$

There are other relations given below which exist on account of the nature of the windings provided by this invention, and these are of use therefore in describing the invention.

Consider first the single windings as illustrated in Figs. 1 and 2. Here $q=1$ and $C_L=1$. The relations are:

Span of coils when M is odd $= Y_L \times M = Y_H$

Span of coils when M is even $= Y_L(M-1) = Y_H \times \frac{M-1}{M}$

If in these same windings $C_L$ is made greater than one, then we have a group of $C_L$ adjacent slots which belong to the same pole and phase, and the conductors contained in these slots are all connected in series.

Number of such groups in the winding $= 2P_L = M \times 2P_H$

Spacing between centers of adjacent groups =

$$Y_L = \frac{Y_H}{M} = C_L$$

Consider now multiphase windings such as those illustrated in Fig. 3. The aforementioned restriction on possible windings says a winding is possible provided $M/q$ is not a whole number.

The number of slots in the whole winding $= C_L \times q \times 2P_L = C_H \times q \times 2P_H = C_L \times q \times M \times 2P_H$ The number of groups in the whole winding $= q \times 2P_L = q \times M \times 2P_H$ Spacing between the centers of adjacent groups $= \frac{Y_L}{q} = \frac{Y_H}{q \times M}$ Spacing between the centers of adjacent groups in the same phase $= Y_L = \frac{Y_H}{M}$ Spacing between the centers of corresponding groups in different phases $= \frac{A \times Y_H}{q} = \frac{A \times Y_L \times M}{q}$ where A is any integer up to $q$ All other factors are the same as for the single winding.

When M is even the number of groups $(=M \times 2P_H)$ is also even, no matter whether $P_H$ is odd or even. So, when the winding is divided into two sections, one of which remains unchanged and the other of which reverses at changeover, then there are equal numbers of coil groups ($\tfrac{1}{2} \times M \times 2P_H$) in each winding section, and the total E. M. F.'s generated in each winding section are equal on both low and high speeds. When M is an odd number, then there are $\tfrac{1}{2} \times (M-1) \times 2P_H$ coil groups in the winding section that does not change and $\tfrac{1}{2} \times (M+1) \times 2P_H$ coil groups in the winding section which reverses at changeover. On the low speed connection, the same E. M. F. is generated in each coil group so the total E. M. F.'s of the two winding sections are not equal on the low speed connection. On the high speed connection, however, the E. M. F.'s in the coil groups are not all equal and it always works out that the total E. M. F.'s of the two winding sections are equal on the high speed connection.

Thus it is always possible to connect the two winding sections in parallel on the high speed connection, despite the fact that the two parallel sections do not always contain equal numbers of coil groups.

Figure 4:
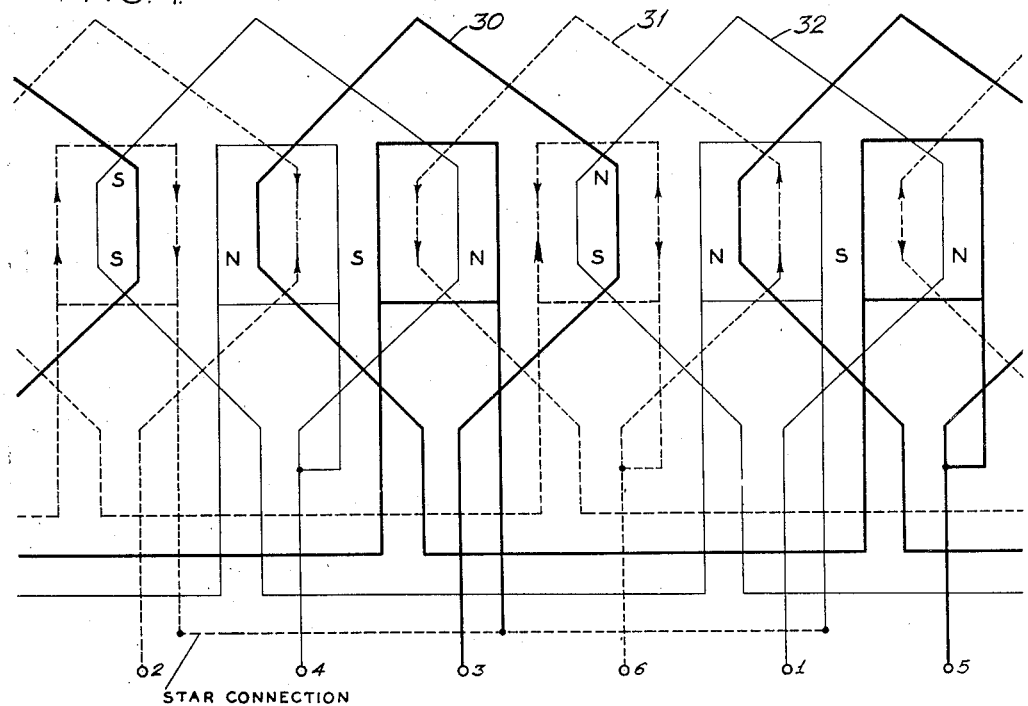

In Figs. 1 through 3 and the mathematical discussion given above in explanation of the invention, basket type coils have been assumed, but the invention is not confined to this type of coil. A machine constructed according to this invention may use any type or arrangement of coils that results in the pattern of conductors in the slots illustrated and described. Thus the windings illustrated in Figs. 3 and 4 have identical patterns of conductors in the slots, but the type and arrangement of the coils differ greatly. They are both three-phase two and eight pole windings in twenty-four slots, but Fig. 3 is a single layer basket winding, while Fig. 4 is a single layer winding of mixed basket and concentric coils. Thus the phase windings 30, 31 and 32 in Fig. 4 each comprises two sections as in Fig. 3, but each section comprises a basket coil and a concentric coil having spans respectively of nine and three slots.

Figure 5:
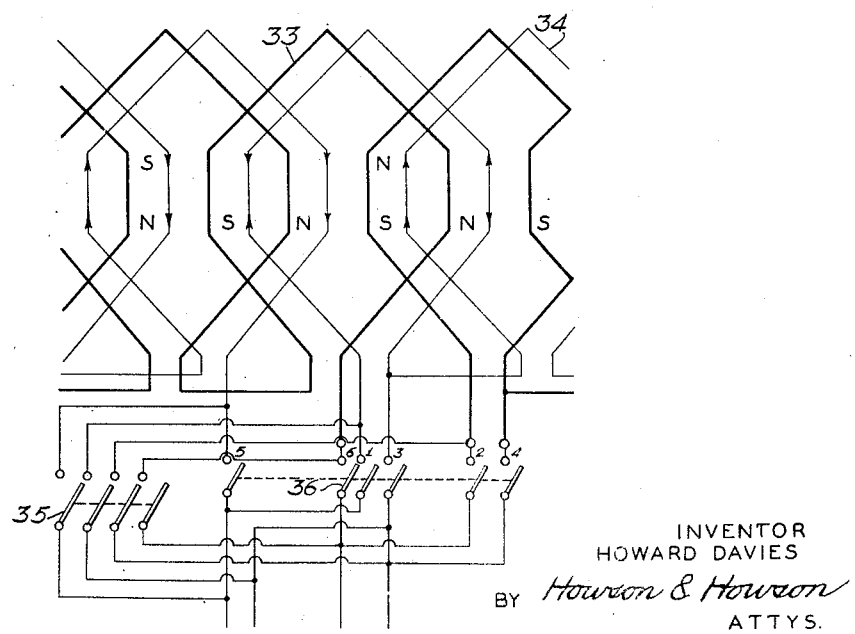

Fig. 5 shows a two-phase two and six pole winding arrangement, having phase windings 33 and 34, in twelve slots which is derived directly from the 3:1 ratio winding in Fig. 2. For low speed operation switch 35 is closed while for high speed operation switch 36 is closed.

Figure 6:
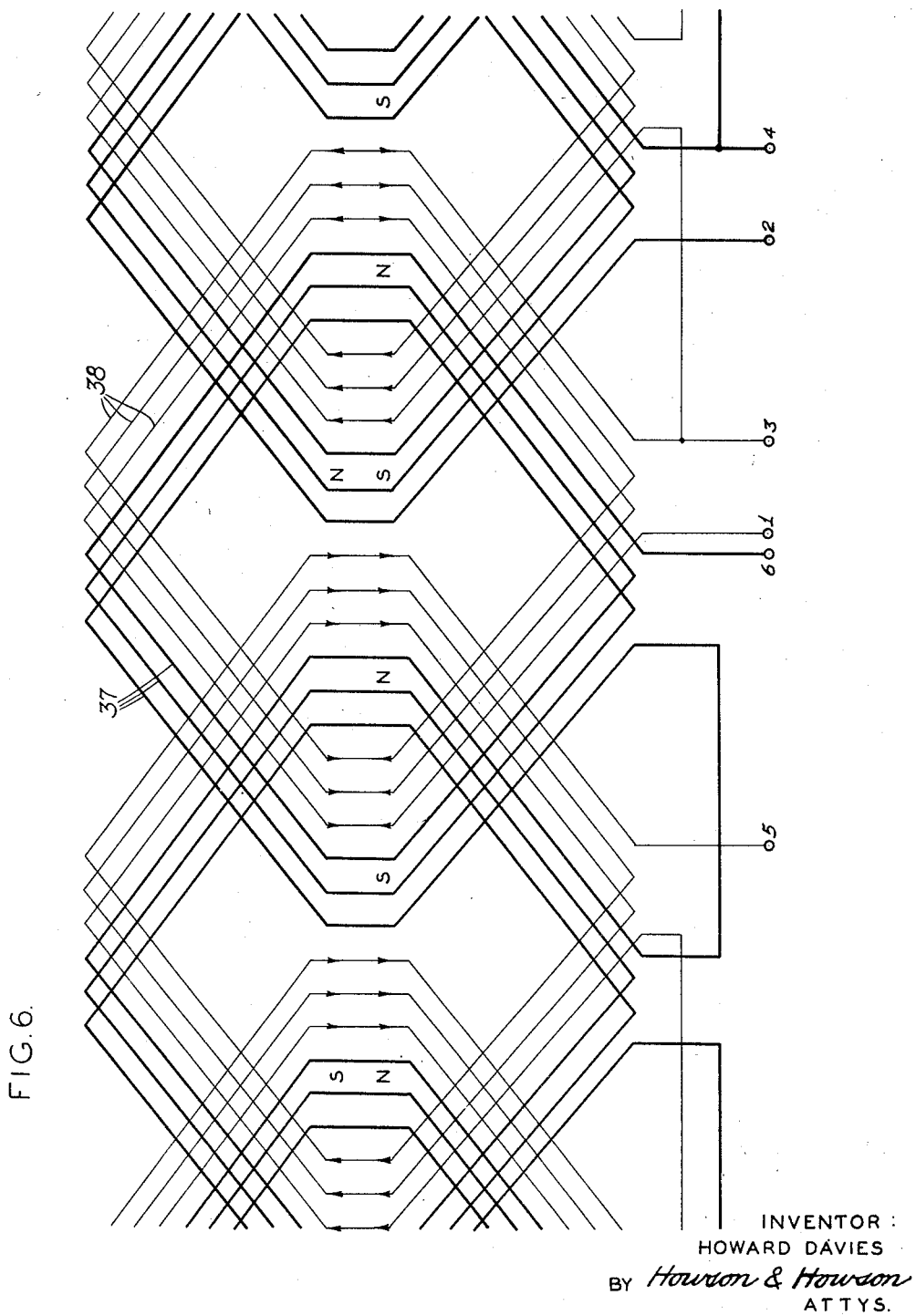

Fig. 6 shows a similar winding arrangement, having phase windings 37 and 38 in which each single slot of Fig. 5 is replaced by a group of three adjacent slots, with the conductors connected in series. Thus Fig. 6 is an example of a winding arrangement employing conductor groups as above described.

In the arrangements of Figs. 1 to 6, the number of coils is equal to one-half the number of slots. In Fig. 7, there is shown one phase 39 of a two- and ten-pole, thirty slot, three-phase motor in which double layer windings are employed. It will be understood that the other two phases will be identical with that shown, and will be displaced therefrom by 120° and 240° respectively. The switching arrangement shown in Fig. 3 may be employed.

A distinguishing characteristic of all winding arrangements according to this invention is that during low speed connection, the slot-occupying conductor or conductors of each phase occupies at least $1/q$ of each pole belt, $q$ being the number of phases, and during high speed connection, the slot-occupying conductors or conductor groups are distributed uniformly between successive pole centers, i. e. through substantially 180 electrical degrees, and the conductors of the different phases are interleaved or interspersed in relation to one another so that the slot-occupying conductors of each phase are spread over substantially the entire pole belt. Thus in the case of a three-phase motor, during low speed connection, the slot-occupying conductor or conductors of each phase occupies 60° of the pole belt, while in the case of a two-phase motor such conductor or conductors occupies 90° of the pole belt.

Further, where all of the coils are similar and are evenly spaced, the winding is characterized in the following respects.

(1) The span of the coils, when the speed ratio M is odd, is equal to $Y_L \times M$, i. e. the product of the low speed pole pitch and the speed ratio.
(2) When the speed ratio M is an odd number, the span of the coils is equal to the high speed pole pitch $Y_H$.
(3) The span of the coils when the ratio M is even is equal to $Y_L(M-1)$, i. e. the product of the low speed pole pitch and the speed ratio minus one.
(4) When the speed ratio M is an even number, the span of the coils is equal to $$Y_H \times \frac{M-1}{M}$$

(5) In three-phase motors, the span of the coils is always an odd number, and the low speed pole pitch is nearly always three or a multiple thereof.
(6) In two-phase motors, or single phase motors with a starting winding, the span of the coils is always an even number, and the low speed pole pitch is nearly always two or a multiple thereof.

While the connections shown in Fig. 3 with six leads used for three phase, give series star for the low speed connection, and two parallel star for the high speed connection, the invention is not limited to any particular connection. It is evident that different relative torque values can be obtained between the low and the high speeds by using different connections well known to those versed in the art, such as one star on low speed and one delta high speed, one star or one delta on low speed and the same connection on high speed, two star on high speed and one delta on low speed, etc.

Another unique feature, of a winding arrangement according to this invention, is the fact that in windings with odd ratios, 3 to 1, 5 to 1 etc., the division of the coils results in there being more coils in one section than in the other. However, the position of the various coils in the slots in the high speed connection is such that equal E. M. F.'s are generated in both sections of the winding, so that they can be safely paralleled.

The illustrated and described embodiments have been chosen as generally typical of the many embodiments of this invention which are possible. While the illustrated embodiments employ windings which are regular and full pitched, application of the invention to fractional pitch windings is contemplated wherever feasible. It will be understood therefore that the invention is not limited to the embodiments shown but contemplates such other embodiments as may be devised by those skilled in the art.

I claim:

1. In a polyphase multi-speed alternating current motor producing speed ratios other than 2:1, a continuous winding for each phase providing conductors occupying slots, each winding comprising a plurality of sections defined by taps for supplying current to the winding, said sections being arranged to produce different numbers of magnetic poles by reversal of current flow in one of said sections, thus producing different speeds of the motor, each winding being characterized in that during minimum speed operation the slot-occupying conductor or conductors of each phase occupies at least $1/q$ of each phase belt, $q$ being the number of phases, and during maximum speed operation the slot-occupying conductors or conductor groups are uniformly distributed between successive pole centers, and the conductors of the different phases are interspersed or interleaved in relation to one another, so that the slot-occupying conductors of each phase are spread over substantially the entire pole belt.

2. A motor according to claim 1, wherein the windings have a total number of coils equal to one-half the number of occupied slots.

3. A motor according to claim 1, wherein the windings have a total number of coils equal to the number of occupied slots.

4. In a two-speed alternating current motor, at least one continuous multi-coil winding comprising two sections defined by taps for supplying current to the winding, said sections being arranged to produce two different numbers of magnetic poles by reversal of current flow in one of said sections, said numbers being related in an odd ratio M, thereby to produce two different speeds related in the same ratio, the span of the coils of said winding being equal to $Y_L \times M$, where Y is the pole pitch expressed as number of slots, and the subscript L refers to low speed each winding being characterized in that during minimum speed operation the slot-occupying conductor or conductors of each phase occupies at least $1/q$ of each phase belt, $q$ being the number of phases, and during maximum speed operation the slot-occupying conductors or conductor groups are uniformly distributed between successive pole centers, and the conductors of the different phases are interspersed or interleaved in relation to one another, so that the slot-occupying conductors of each phase are spread over substantially the entire pole belt.

5. In a two-speed alternating current motor, at least one continuous multi-coil winding comprising two sections defined by taps for supplying current to the winding, said sections being arranged to produce two different numbers of magnetic poles by reversal of current flow in one of said sections, said numbers being related in an odd ratio M, thereby to produce two different speeds related to the same ratio, the span of the coils of said winding being equal to $Y_H$, where Y is the pole pitch expressed as number of slots, and the subscript H refers to high speed each winding being characterized in that during minimum speed operation the slot-occupying conductor or conductors of each phase occupies at least $1/q$ of each phase belt, $q$ being the number of phases, and during maximum speed operation the slot-occupying conductors or conductor groups are uniformly distributed between successive pole centers, and the conductors of the different phases are interspersed or interleaved in relation to one another, so that the slot-occupying conductors of each phase are spread over substantially the entire pole belt.

6. In a two-speed alternating current motor producing speed ratios other than 2:1, at least one continuous multi-coil winding comprising two sections defined by taps for supplying current to the winding, said sections being arranged to produce two different numbers of magnetic poles by reversal of current flow in one of said sections, said numbers being related in an even ratio M, other than 2, thereby to produce two different speeds related in the same ratio, the span of the coils of said winding being equal to $Y_L(M-1)$, where Y is the pole pitch expressed as number of slots, and the subscript L refers to low speed each winding being characterized in that during minimum speed operation the slot-occupying conductor or conductors of each phase occupies at least $1/q$ of each phase belt, $q$ being the number of phases, and during maximum speed operation the slot-occupying conductors or conductor groups are uniformly distributed between successive pole centers, and the conductors of the different phases are interspersed or interleaved in relation to one another, so that the slot-occupying conductors of each phase are spread over substantially the entire pole belt.

7. In a two-speed alternating current motor producing speed ratios other than 2:1, at least one continuous multi-coil winding comprising two sections defined by taps for supplying current to the winding, said sections being arranged to produce two different numbers of magnetic poles by reversal of current flow in one of said sections, said numbers being related in an even ratio M, other than 2, thereby to produce two different speeds related in the same ratio, the span of the coils of said winding being equal to $$Y_H \times \frac{M-1}{M}$$

where Y is the pole pitch expressed as number of slots, and the subscript H refers to high speed each winding being characterized in that during minimum speed operation the slot-occupying conductor or conductors of each phase occupies at least $1/q$ of each phase belt, $q$ being the number of phases, and during maximum speed operation the slot-occupying conductors or conductor groups are uniformly distributed between successive pole centers, and the conductors of the different phases are interspersed or interleaved in relation to one another, so that the slot-occupying conductors of each phase are spread over substantially the entire pole belt.

8. In a polyphase two-speed alternating current motor, a continuous multi-coil winding for each phase comprising two sections defined by taps for supplying current to the winding, said sections being arranged to produce two different numbers of magnetic poles by reversal of current flow in one of said sections, said numbers being related in an odd ratio M, thereby to produce two different speeds having the same ratio, the span of the coils of each winding being equal to $Y_L \times M$, where Y is the pole pitch expressed as number of slots and the subscript L refers to low speed each winding being characterized in that during minimum speed operation the slot-occupying conductor or conductors of each phase occupies at least $1/q$ of each phase belt, $q$ being the number of phases, and during maximum speed operation the slot-occupying conductors or conductor groups are uniformly distributed between successive pole centers, and the conductors of the different phases are interspersed or interleaved in relation to one another, so that the slot-occupying conductors of each phase are spread over substantially the entire pole belt.

9. In a polyphase two-speed alternating current motor, a continuous multi-coil winding for each phase comprising two sections defined by taps for supplying current to the winding, said sections being arranged to produce two different numbers of magnetic poles by reversal of current flow in one of said sections, said numbers being related in an odd ratio M, thereby to produce two different speeds having the same ratio, the span of the coils of each winding being equal to $Y_H$, where Y is the pole pitch expressed as number of slots and the subscript H refers to high speed each winding being characterized in that during minimum speed operation the slot-occupying conductor or conductors of each phase occupies at least $1/q$ of each phase belt, $q$ being the number of phases, and during maximum speed operation the slot-occupying conductors or conductor groups are uniformly distributed between successive pole centers, and the conductors of the different phases are interspersed or interleaved in relation to one another, so that the slot-occupying conductors of each phase are spread over substantially the entire pole belt.

10. In a polyphase two-speed alternating current motor producing speed ratios other than 2:1, a continuous multi-coil winding for each phase comprising two sections defined by taps for supplying current to the winding, said sections being arranged to produce two different numbers of magnetic poles by reversal of current flow in one of said sections, said numbers being related in an even ratio M, other than 2, thereby to produce two different speeds having the same ratio, the span of the coils of each winding being equal to $Y_L(M-1)$, where Y is the pole pitch expressed as number of slots and the subscript refers to low speed each winding being characterized in that during minimum speed operation the slot-occupying conductor or conductors of each phase occupies at least $1/q$ of each phase belt, $q$ being the number of phases, and during maximum speed operation the slot-occupying conductors or conductor groups are uniformly distributed between successive pole centers, and the conductors of the different phases are interspersed or interleaved in relation to one another, so that the slot-occupying conductors of each phase are spread over substantially the entire pole belt.

11. In a polyphase two-speed alternating current motor producing speed ratios other than 2:1, a continuous multi-coil winding for each phase comprising two sections defined by taps for supplying current to the winding, said sections being arranged to produce two different numbers of magnetic poles by reversal of current flow in one of said sections, said numbers being related in an even ratio M, other than 2, thereby to produce two different speeds having the same ratio, the span of the coils of each winding being equal to $$Y_H \times \frac{M-1}{M}$$

where Y is the pole pitch expressed as number of slots, and the subscript H refers to high speed each winding being characterized in that during minimum speed operation the slot-occupying conductor or conductors of each phase occupies at least $1/q$ of each phase belt, $q$ being the number of phases, and during maximum speed operation the slot-occupying conductors or conductor groups are uniformly distributed between successive pole centers, and the conductors of the different phases are interspersed or interleaved in relation to one another, so that the slot-occupying conductors of each phase are spread over substantially the entire pole belt.

12. In a three-phase two-speed alternating current motor producing speed ratios other than 2:1, a continuous multi-coil winding for each phase comprising two sections defined by taps for supplying current to the winding, said sections being arranged to produce two different numbers of magnetic poles by reversal of current flow in one of said sections, whereby to produce two different speeds of the motor, the span of each of the coils of said winding being an odd multiple of the low speed pole pitch each winding being characterized in that during minimum speed operation the slot-occupying conductor or conductors of each phase occupies at least ⅓ of each phase belt and during the maximum speed operation the slot-occupying conductors or conductor groups are uniformly distributed between successive pole centers, and the conductors of the different phases are interspersed or interleaved in relation to one another so that the slot-occupying conductors of each phase are spread over substantially the entire pole belt.

13. In a two-phase two-speed alternating current motor producing speed ratios other than 2:1, a continuous multi-coil winding for each phase comprising two sections defined by taps for supplying current to the winding, said sections being arranged to produce two different numbers of magnetic poles by reversal of current flow in one of said sections, whereby to produce two different speeds of the motor, the span of each of the coils of said winding being an even multiple, other than 2, of the low speed pole pitch each winding being characterized in that during minimum speed operation the slot-occupying conductor or conductors of each phase occupies at least ½ of each phase belt and during the maximum speed operation the slot-occupying conductors or conductor groups are uniformly distributed between successive pole centers, and the conductors of the different phases are interspersed or interleaved in relation to one another so that the slot-occupying conductors of each phase are spread over substantially the entire pole belt.

14. In a multi-speed alternating current motor producing speed ratios other than 2:1, at least one winding comprising a plurality of sections arranged to produce different numbers of magnetic poles by reversal of current flow in one of said sections, thus producing different speeds of the motor, said winding being characterized in that it has slot-occupying conductors arranged in groups, the number of groups being equal to $2P_L = M \times 2P_H$, and the spacing between centers of adjacent groups being equal to $$Y_L = \frac{Y_H}{M} = C_L$$

where 2P is the number of poles, the subscripts L and H refer to low and high speed, M is the speed ratio, Y is the pole pitch expressed as number of slots, and C is the number of slots per pole per phase each winding being characterized in that during minimum speed operation the slot-occupying conductor or conductors of each phase occupies at least $1/q$ of each phase belt, $q$ being the number of phases, and during maximum speed operation the slot-occupying conductors or conductor groups are uniformly distributed between successive pole centers, and the conductors of the different phases are interspersed or interleaved in relation to one another, so that the slot-occupying conductors of each phase are spread over substantially the entire pole belt.

15. In a polyphase multi-speed alternating current motor producing speed ratios other than 2:1, a winding for each phase providing conductors occupying slots, each winding comprising a plurality of sections arranged to produce different numbers of magnetic poles by reversal of current flow in one of said sections, thus producing different speeds of the motor, the windings being characterized in that each has slot-occupying conductors arranged in groups, the total number of groups being equal to $q \times 2P_L = q \times M \times 2P_H$, the spacing between the centers of adjacent groups in each phase being equal to $$Y_L = \frac{Y_H}{M}$$

and the spacing between centers of corresponding groups in different phases being equal to $$\frac{A \times Y_H}{q} = \frac{A \times Y_L \times M}{q}$$

where $q$ is the number of phases, 2P is the number of poles, the subscripts L and H refer to low and high speed, M is the speed ratio, Y is the pole pitch expressed as number of slots, and A is any integer up to $q$ each winding being characterized in that during minimum speed operation the slot-occupying conductor or conductors of each phase occupies at least $1/q$ of each phase belt, $q$ being the number of phases, and during maximum speed operation the slot-occupying conductors or conductor groups are uniformly distributed between successive pole centers, and the conductors of the different phases are interspersed or interleaved in relation to one another, so that the slot-occupying conductors of each phase are spread over substantially the entire pole belt.

16. The winding structure of claim 1 in which the motor is a two speed motor having a speed ratio other than 2:1 and in which the taps of the windings are arranged so that neither speed requires the connection of more than six leads to a control switch.

17. The winding structure of claim 1 for a three phase motor having three windings and in which $q$ is 3.

18. The winding structure of claim 1 in which the motor is a three phase two speed motor, in which the ratio speeds is not less than four and in which one speed is obtained by connecting not more than three leads to the control switch and the other speed is obtained by connecting not more than six leads to the control switch, the leads being connected to the taps on the windings.

References Cited in the file of this patent

UNITED STATES PATENTS

| | | |
|---|---|---|
| 1,495,420 | Lewis | May 27, 1924 |
| 2,217,460 | Trassel | Oct. 8, 1940 |